Nov. 19, 1929.  E. SILEN  1,736,223
COMBINATION BAKER, OVEN, AND GRIDDLE
Filed Dec. 13, 1928
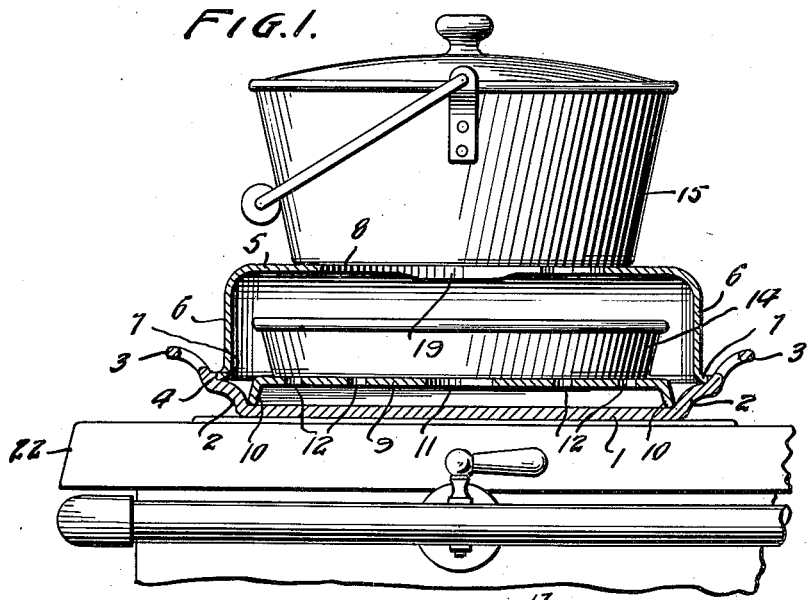
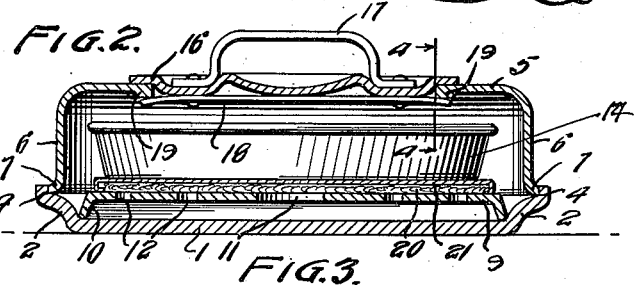
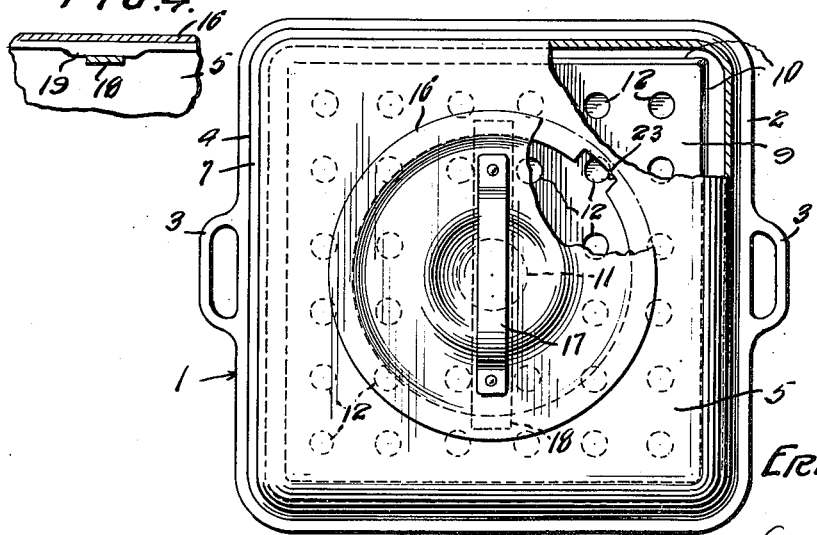
Inventor
ERICK SILEN
By Lester L. Sargent
Attorney Patented Nov. 19, 1929

1,736,223

UNITED STATES PATENT OFFICE

ERICK SILEN, OF STELLA, WASHINGTON

COMBINATION BAKER, OVEN, AND GRIDDLE

Application filed December 13, 1928. Serial No. 325,845.

My invention relates to a combination baker, oven and griddle for use on gas or coal stoves in which is provided a heavy griddle to retain the heat and to insure effective baking and to provide a device of this character which is of simple and efficient construction with relatively few parts and which can be manufactured at a comparatively small cost.

I attain these and other objects of my invention by the mechanism inllustrated in the accompanying drawings, in which,—

Figure 1 is a vertical section through the invention with the kettle shown in side elevation;

Fig. 2 is a vertical section with the kettle removed and an asbestos pad in place under the bake pot;

Fig. 3 is a top plan view of the invention with a portion of the cover broken away; and Fig. 4 is a detail vertical section on line 4—4 of Fig. 2.

Like numerals designate like parts in each of the several views.

Referring to the accompanying drawings I provide a griddle 1 preferably having curved flanged edges 2, as shown in Fig. 2, and a peripheral groove 4. I provide a hot pot or oven 6 on the griddle 1, this hot pot having a flat top portion 5 provided with a large central opening 8. I provide a suitable tray 9 mounted on the griddle 1, said tray preferably being provided with downward peripheral flange 10 and with a plurality of apertures 12 and a central opening 11 for convenience in lifting the tray out. I provide a pan 14 (any suitable pan) on the tray 9 to contain the food to be cooked within the bake pot 6. I may place a suitable kettle 15 over the opening 8 of the cover of the bake pot or I may in place of the kettle 15 provide a preferably corrugated lid 16 having a handle 17 and a fastening clip 18, the ends of which are of suitable length to project under the peripheral edges of the top portion 5 of bake pot 6 and to be inserted or released through the slot 23, (or slots, for more than one may be provided for convenience,) in the top portion of the bake pot as shown in Fig. 3. To reduce the intensity of the heat I may provide an asbestos pad 20 covered by a metal reinforcement 21, as shown in Fig. 2, and placed on the tray 9 and under the pan 14. I may, if desired, provide spaced enlarged portions 19 around the periphery of the top portion of the bake pot to frictionally engage the clip 18 to more securely hold the lid in place. The numeral 22 designates a gas or any suitable stove on which the invention is placed. Griddle 1 has opposite handles 3.

To apply the lid 16 it is placed on the flat top portion 5 of the bake pot 6 with the clip in position to be inserted through the slot 23 at one end, while the other end engages under the peripheral edge of the circular opening in the top portion of the bake pot. The lid is then rotated to cause both ends of the clip to engage with the underside of the peripheral edge of the bake pot. This arrangement makes it more convenient to move the oven off and on to the griddle or bottom part of the device and it does not cost any more than the expense of the bar or clip 18 and the rivets for fastening it on. The lid, of course, may be removed entirely when the kettle is placed on the top of the bake pot 6 for cooking vegetables and other foods.

The bake pot is intended especially for baking such articles of food as potatoes, apples or the like which are baked and to provide a device which will do the baking on top of the stove without heating the whole house and which will bake quickly and thereby save time and fuel. While the baker will function as mentioned above it can also be used as a steamer, by placing a little water in the griddle.

One of the advantages of this invention is the few number parts and the ease with which it may be assembled and disassembled, permitting it to be used either as a toaster, frier, hot cake baker or bake pot, while at the same time it is readily portable. The corrugated lid 16 will also serve as a self-basting device and while roasting or baking articles of food they can be looked after by moving the lid and still not lose any heat to speak of. All food should be placed preferably in the pan or plate 14 and not on the tray 9. The asbestos plate may be either used or omitted according to the intensity of heat desired.

What I claim is:

1. In a device of the class described, the combination of a griddle, a tray having the main portion thereof spaced slightly above the griddle, said tray having a series of apertures therein, a pan removably mounted on the tray, a hot pot cover mounted on the griddle in spaced relation to the tray, said cover having a large central opening.

2. In a device of the class described, the combination of a griddle, a tray having the main portion thereof spaced slightly above the griddle, said tray having a series of apertures therein, a pan removably mounted on the tray, a hot pot cover mounted on the griddle in spaced relation to the tray, said cover having a large central opening, and a lid removably mounted on the hot pot cover.

3. In a device of the class described, the combination of a griddle, a tray having the main portion thereof spaced slightly above the griddle, said tray having a series of apertures therein, a hot pot cover mounted on the griddle in spaced relation to the tray, said cover having a large central opening, and a lid removably mounted on the hot pot cover.

4. A griddle of relatively heavy material, said griddle having opposite handles, a tray having a downturned flange portion seated on the griddle, said tray having a series of apertures therethrough, a hot pot seated on the griddle and of larger size than the tray to seat in spaced relation thereto on the griddle, said hot pot having a large central aperture and having a substantially flat top, and a lid removably seated on the aforesaid aperture of the hot pot whereby either the lid or the kettle may be placed on the hot pot.

5. A griddle of relatively heavy material, said griddle having opposite handles, a tray having a down turned flange portion seated on the griddle, said tray having a series of apertures therethrough, a hot pot seated on the griddle and of larger size than the tray to seat in spaced relation thereto on the griddle, said hot pot having a large central aperture and having a substantially flat top, a lid removably seated on the aforesaid aperture of the hot pot whereby either the lid or the kettle may be placed on the hot pot, the said lid being corrugated whereby the hot pot will function as a self-basting oven, and a tray having the main portion thereof spaced slightly above the griddle.

6. In a device of the class described, the combination of a griddle, a tray having the main portion thereof spaced slightly above the griddle, a metal reinforced asbestos plate mounted on the tray, a pan mounted on the asbestos plate, a cover constituting the hot pot, said cover having an apertured flat top, and a corrugated lid removably mounted on the apertured portion of the hot pot.

ERICK SILEN.